W. E. NICKERSON.
Machine for Manufacturing Circular Saws.
No. 199,308. Patented Jan. 15, 1878.

Witnesses.
S. N. Piper
L. H. Miller

Inventor
Wm. E. Nickerson.
by his attorney.
R. H. Eddy

UNITED STATES PATENT OFFICE.

WILLIAM E. NICKERSON, OF SOMERVILLE, MASSACHUSETTS.

IMPROVEMENT IN MACHINES FOR MANUFACTURING CIRCULAR SAWS.

Specification forming part of Letters Patent No. 199,308, dated January 15, 1878; application filed December 26, 1877.

*To all whom it may concern:*

Be it known that I, WILLIAM E. NICKERSON, of Somerville, of the county of Middlesex and State of Massachusetts, have invented a new and useful or Improved Machine for Manufacturing Circular Saws; and do hereby declare the same to be described in the following specification and represented in the accompanying drawings, of which—

Figure 1:
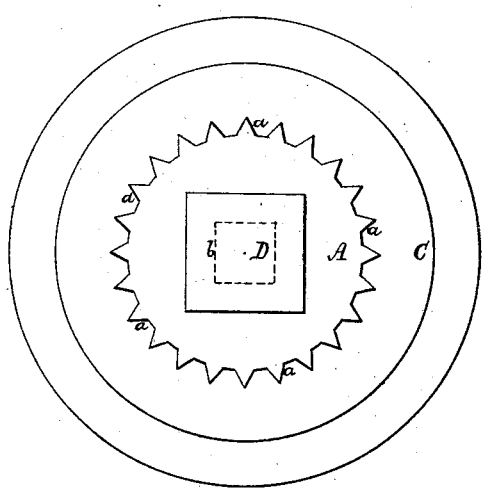
Figure 3:
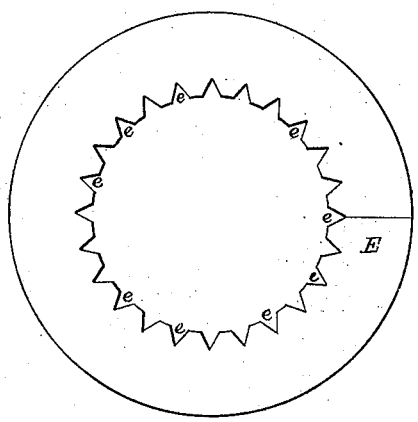
Figure 2:
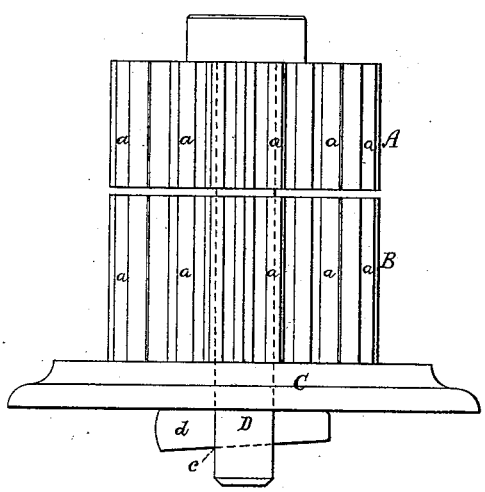

Figure 1 is a top view, and Fig. 2 a side elevation, of the serrated male die and saw-plate supporter. Fig. 3 is a lower end view, and Fig. 4 a side view, of the tubular female die to operate with the said male die.

The machine is to cut from a plate during a downward movement of the female die on the male die, or during an upward movement of the latter within the former, a circular saw with all its teeth, the plate being interposed between and firmly held by the two serrated or ribbed portions of the male die.

In the drawings, A and B are the said two serrated or ribbed portions of the male die, each having a transverse section corresponding in shape with that of a saw to be made, in which case each may be said to be a cylinder having projecting from its circumference a series of triangular prismatic ribs, *a a a*, arranged at equal distances apart.

The lower portion B is supported on or fixed to a base, C, and there is a prismatic aperture, *b*, going axially through each of the said die portions. A correspondingly prismatic bolt, D, goes down through the said apertures, and has its head resting on the top of the upper die portion A. The bolt extends below the base, and has a slot, *c*, to receive a key or wedge, *d*, which, on being driven into the slot and against the base, serves to cause the bolt to be drawn downward.

Preparatory to a plate being reduced to the form of a saw, such plate, having an eye made through it at its central part, is to be placed between the two die portions A B, after which their connecting-bolt should be run through them and the eye of the plate, and the key should be driven into the bolt, so as to cause the plate to be held firmly to and between the two die portions A B, the plate being supposed to have a diameter equal to, if not greater than, that of each of such portions.

Figure 4:
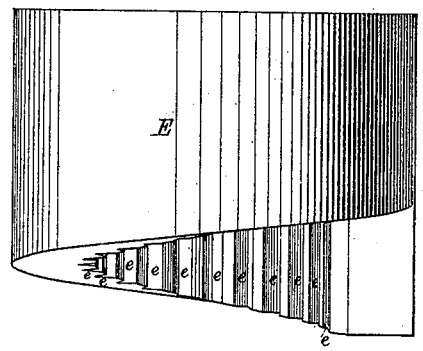

The female die (shown at E) consists of a strong steel tube, fluted or grooved on its inner periphery to correspond with and receive the ribs of the male die, such being as shown at *e e e* in Figs. 3 and 4. The lower end of the female die may be square to the axis, or it may be beveled or helically curved, as shown in Fig. 4, the latter being the preferable construction.

After a saw-plate may have been fixed, as described, in the male die, or between its two portions A B, such male die is to be forced upward into the female die, or the latter is to receive the male die and to be forced downward upon it, so as to shear or cut away from the plate all of it projecting beyond the male die. The part left between the portions A B will be the saw to be produced, the teeth of which may be afterward set and finished, as circumstances may require.

From the above it will be seen that with my machine circular saws can be rapidly made, as all the teeth of one are produced simultaneously or successively during one axial movement of either relatively to the other and the plate, as described. In case the female die has its lower end square with its axis, all the teeth will be simultaneously made; but when such lower end is beveled helically the teeth will be successively cut, all being formed during one movement of the die.

I claim—

The machine, substantially as described, for making circular saws, it consisting of the tubular and channeled female die E and the ribbed male die, composed of the portions A and B, and their clamping bolt or devices, all being constructed and to operate essentially as set forth.

WM. E. NICKERSON.

Witnesses:
R. H. EDDY,
S. N. PIPER.